United States Patent [19]

Foss

[11] Patent Number: 5,222,184
[45] Date of Patent: Jun. 22, 1993

[54] OPTICAL FIBRE SPLICE STORAGE TRAY

[75] Inventor: Raymond C. Foss, Plymouth, United Kingdom

[73] Assignee: Bowthorpe-Hellermann Limited, Crawley, Great Britain

[21] Appl. No.: 838,750

[22] PCT Filed: Oct. 8, 1990

[86] PCT No.: PCT/GB90/01544

§ 371 Date: Mar. 17, 1992

§ 102(e) Date: Mar. 17, 1992

[87] PCT Pub. No.: WO91/06024

PCT Pub. Date: May 2, 1991

[30] Foreign Application Priority Data

Oct. 10, 1989 [GB] United Kingdom ............... 8922745

[51] Int. Cl.$^5$ .............................................. G02B 6/36
[52] U.S. Cl. .................................... 385/135; 385/137
[58] Field of Search ...................... 385/135, 136, 137

[56] References Cited

U.S. PATENT DOCUMENTS 4,627,686 12/1989 Szentesi et al. ................... 350/96.2
4,805,976 2/1989 Bossard et al. ..................... 385/135
4,961,623 10/1990 Midkiff et al. ...................... 385/135

Primary Examiner—John D. Lee
Assistant Examiner—S. W. Barns
Attorney, Agent, or Firm—David P. Gordon

[57] ABSTRACT

An optical fiber splice storage tray having a series of alternate height ridges 33, 34 in which the space or slot between each adjacent pair of ridges is narrow at the root and wider at a higher level so that small cross-section splices 35 can be disposed as an interference fit between any adjacent pair of the ridges larger cross-section splices 36 can be disposed between the same ridges but at a higher level, and very large cross-section splices 37 can be disposed as an intererence fit between any adjacent pair of the alternate higher ridges 34.

20 Claims, 5 Drawing Sheets

OPTICAL FIBRE SPLICE STORAGE TRAY

BACKGROUND OF THE INVENTION

This invention relates to an optical fibre splice storage tray for effecting storage and protection of optical fibre cable splices within a cable jointing closure.

Such trays are used to protect the minute and therefore delicate glass or polymer optical fibres from damage during formation of the cable joint and its enclosure, or during reentry to the closure for maintenance and/or changing the number of splices within the closure. One or more trays can be used in a single closure and each tray holds a number of fibre splices. The maximum number of splices is dependent on the physical size of the tray, but this is largely dictated by the size of the cable jointing closure and space available to store the closure. Each tray is limited in the number of its splices to avoid congestion and tangling of the fibres.

SUMMARY OF THE INVENTION

In accordance with this invention, there is provided an optical fibre splice storage tray, which is provided with a series of ridges, of which alternate ridges are of lesser height than the intervening ridges so that smaller cross-section splices can be disposed as an interference fit between any adjacent pair of the ridges and larger cross-section splices can be disposed as an interference fit between any adjacent pair of the higher ridges.

Preferably there is a narrow space or slot between each adjacent pair of ridges at their roots and a wider space or slot between them at a higher level (but below the tops of the lower-height ridges). Thus very small cross-section splices can be disposed as an interference fit between any adjacent pair of ridges at a higher level, and the larger cross-section splices can be disposed as an interference fit between adjacent ones of the higher ridges (in which case the larger cross-section splice sits over the top of the lesser-height intervening ridge).

Accordingly, this splice storage tray is able to locate and store a number of different types of optical fibre splices, including those which comprise (a) heatshrink sleeves recovered onto the fibres with an inner liner which melts and encapsulates the fused glass fibres, (b) hollow tubular or channel-shaped protectors providing a local environment to reduce impact or stress on the fused glass fibres, (c) mechanical resin encapsulation around the ends of the glass fibres to provide a path for the light to be transmitted through the fibre as well as acting as a splice protector (the resin being anchored to the body of the splice protector which is larger than other types described above), and (d) fold-over splice protectors which are hinged and have a means e.g. adhesive backing to keep them closed.

Preferably the fibre splices once located in the slots are secured with an elastic strap which is tensioned over the top of the tray and across the splices. This is particularly important with the interference fit of the splices in the slots and the possibility of movement in service from vibration or handling of the closure by the jointer. To reduce chaffing due to vibration a mastic or non-stick malleable substance e.g. plasticine can be used to bed the splices firmly into their slots. Each splice can be removed easily by placing a wedge-type tool e.g. a small screwdriver under the splice and towards its end to remove it.

The tray is preferably circular so as to be more able to maximise the optical fibre bend radii near the upper limit of the dimensional band (of 35 mm to 50 mm) than a rectangular shape. Preferably the tray enables the use of cable ties for securing the fibre carrying tubes to the tray, which cable ties can be replaced when adding other tubes. The cable ties when tightened are recessed below the top and bottom surfaces of the tray ensuring ease of stacking. Preferably a number of projections from the top of the tray are provided to ensure that the fibres do not fall out during service. Preferably two central projections are positioned to ensure maximum fibre support. Preferably there are two series of slots to allow splices to be put either side of the tray centre or to be distributed, e.g. staggered every other slot across the width of the tray.

Preferably the strap is set in half-way down the tray to ensure both fibre and splice protector support.

Preferably the tray has four tube carrying anchor points: two are normally spare, however fibre carrying tubes can be supplied to both sides particularly in in-line closures (i.e. closures which cables enter from both ends).

BRIEF DESCRIPTION OF THE DRAWINGS

An embodiment of this invention will now be described by way of example only and with reference to the accompanying drawings, in which.

DETAILED DESCRIPTION OF THE PREFERRED EMBODIMENT

Figure 1:
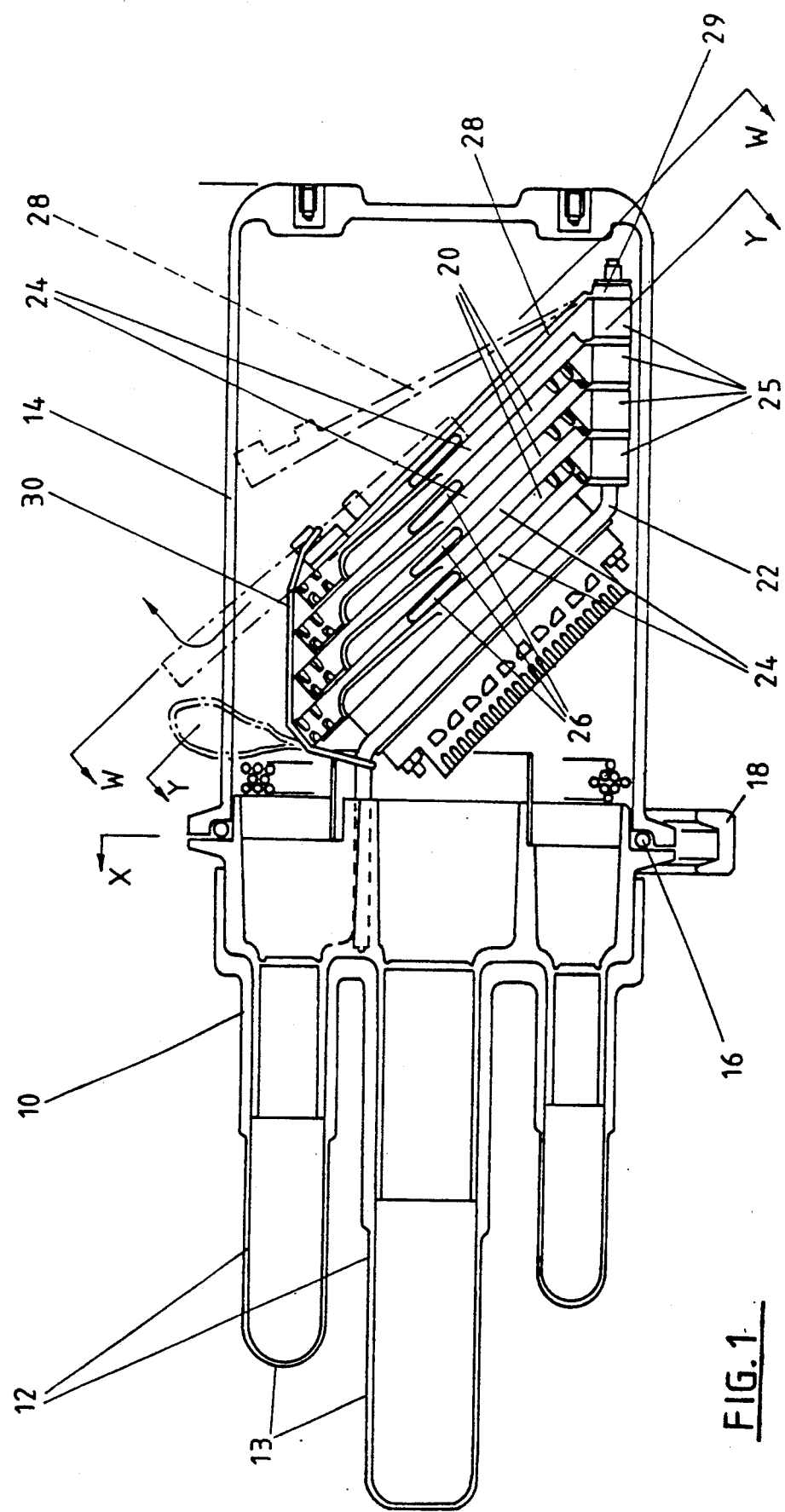
FIG. 1 is a section through an optical fibre cable joint enclosure.
Figure 2:
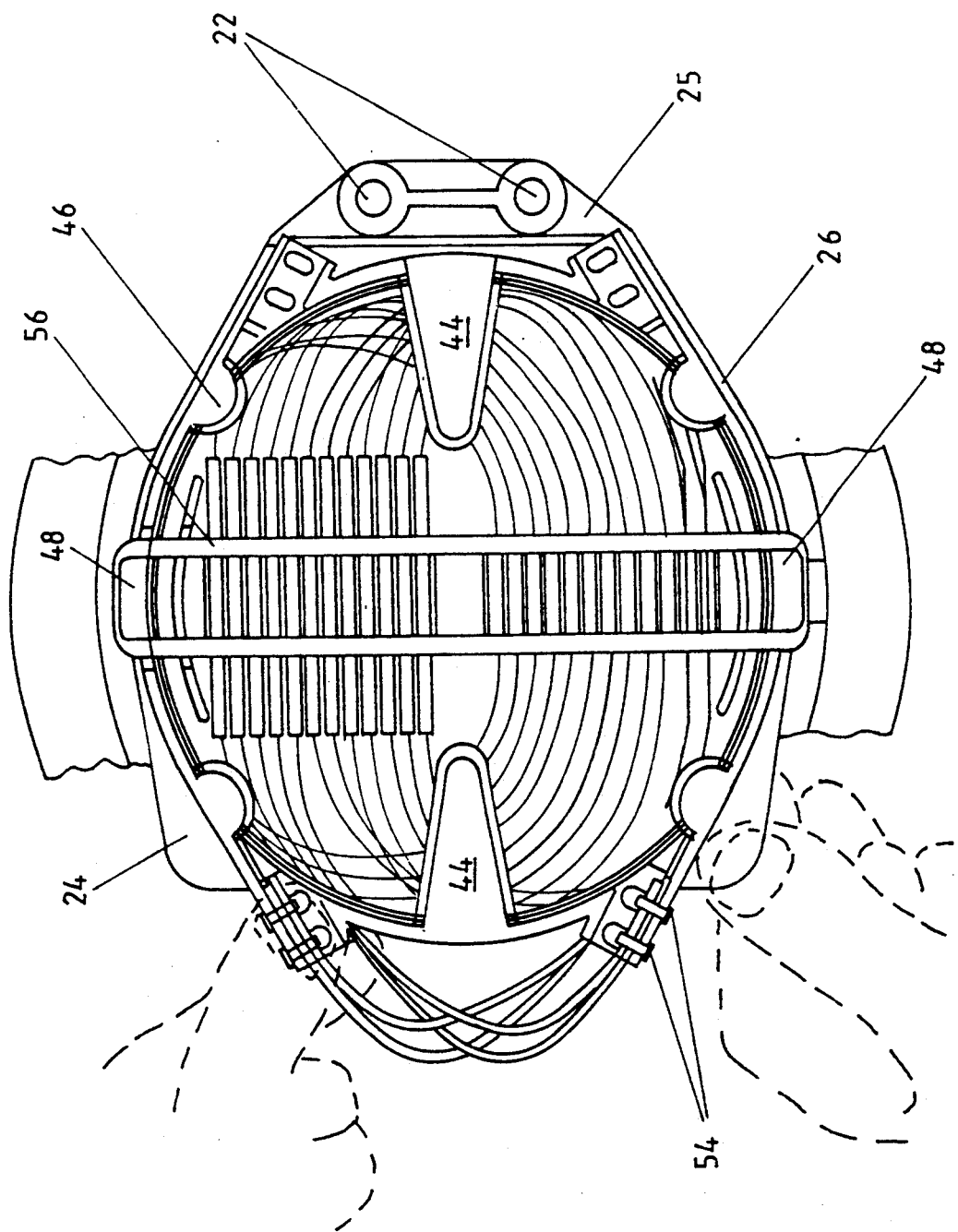
FIG. 2 is a section on the line Y—Y of FIG. 1.
Figure 3:
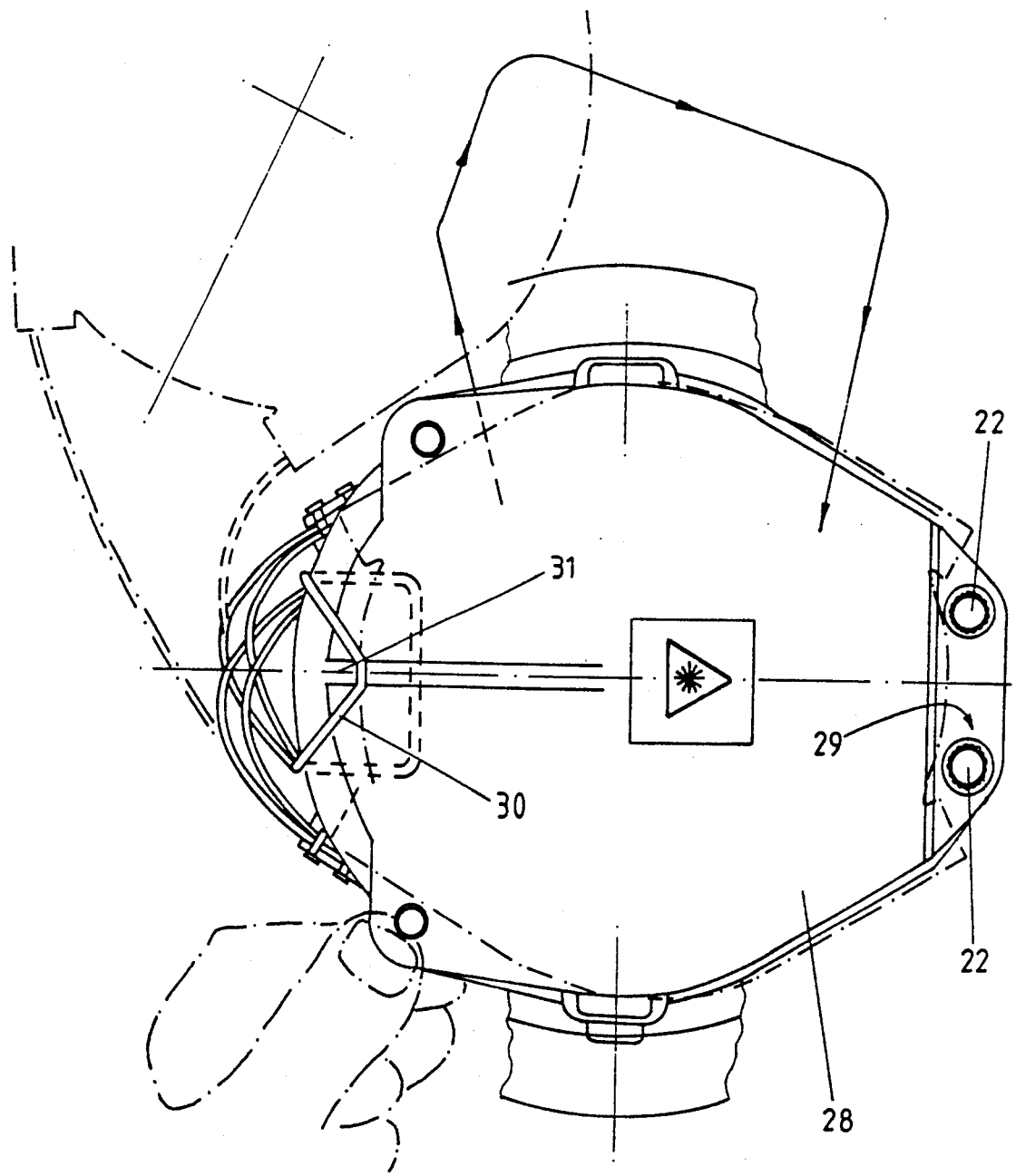
FIG. 3 is a section on the line W—W of FIG. 1.
Figure 4:
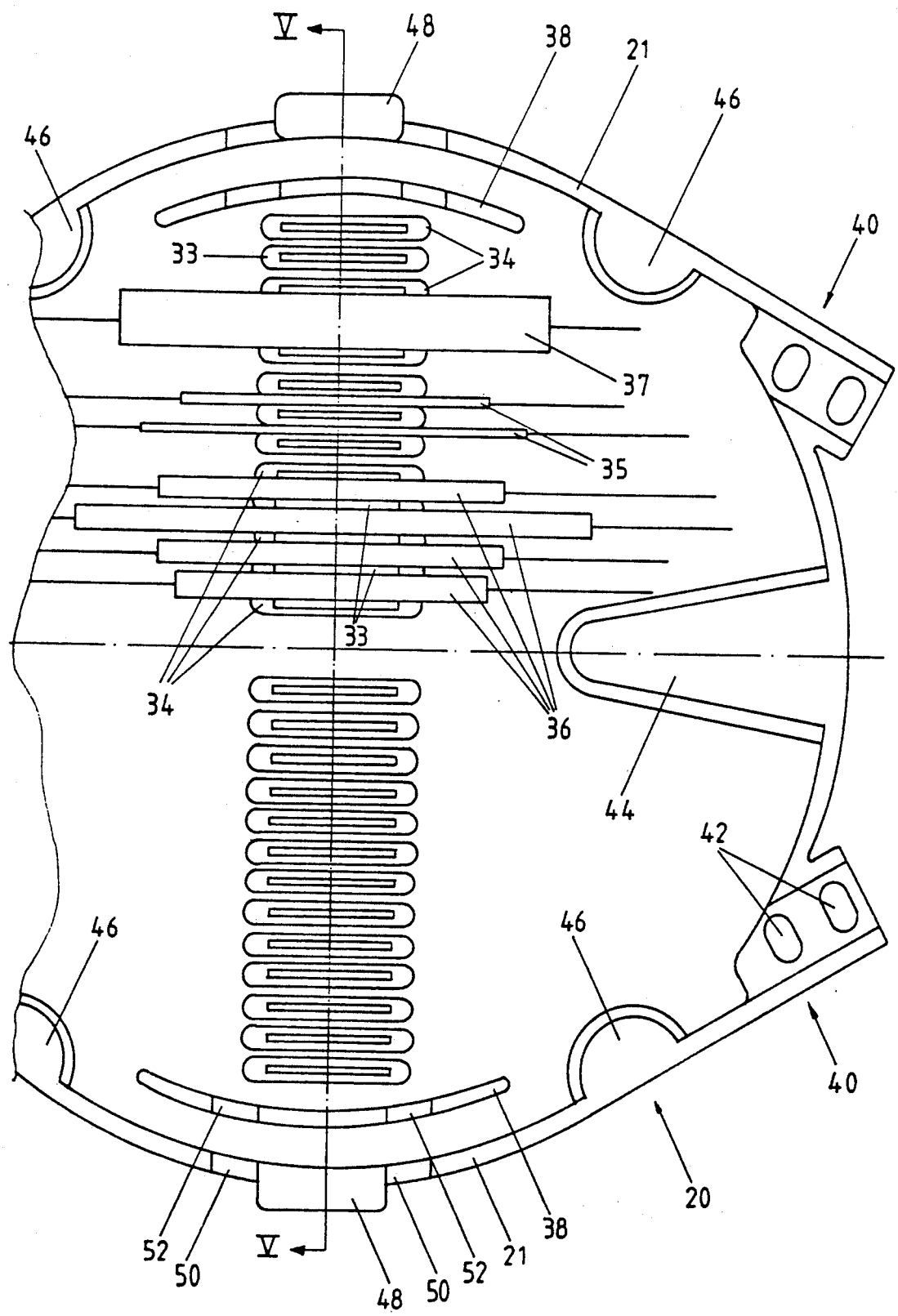
FIG. 4 is a plan view of a splice storage tray.
Figure 5:
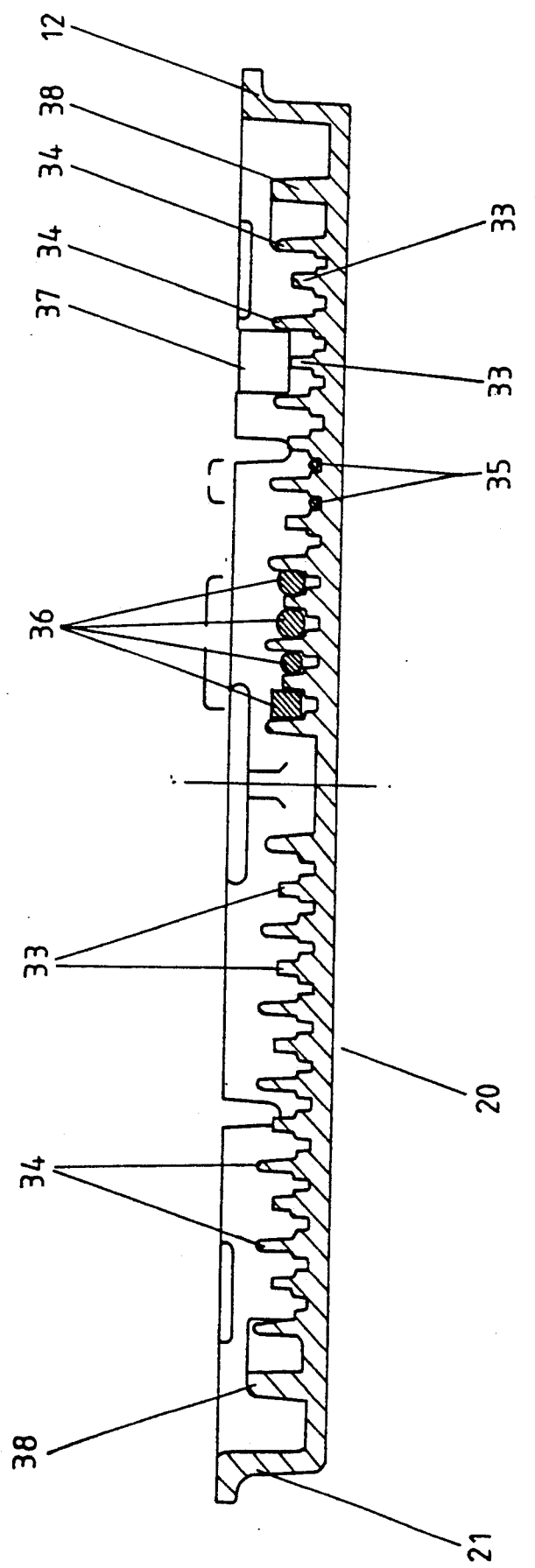
FIG. 5 is a section through the tray on the line V—V of FIG. 4.

Referring to FIG. 1, a joint closure for optical fibre cables comprises a circular base 10 formed with tubular cable-entry ports 12, which incorporate heat-shrink portions 13 for recovering about the cables when these ports are opened and have cables passed therethrough. A cylindrical cover 14, closed at one end, fits over the splice storage trays and against the base 10 with the interposition of a sealing O-ring 16, the base and cover being clamped together by a split ring 18 which engages radial flanges on the base and cover.

The closure contains a number of circular splice storage trays 20 which are mounted in a stack but with each tray inclined to the length of the closure. A pair of arms 22 (one shown in FIG. 1) are engaged in the base 10 and extend first in the inclined direction to the periphery of the closure and then parallel to its length. These arms receive a plurality of plates 24: each plate 24 is generally flat and circular but with a thicker extension 25 formed with two apertures through which the arms 22 pass. The plate is flexible at its junction with the extension 25, so that it can hinge about this line. Each tray 20 sits on a respective plate 24, engaging within walls 26 which extend around part of the periphery of each plate either side of its extension 25. A top plate 28 is also provided, having an extension 29 to which it is hinged, this extension having two holes through which the arms 22 extend: the series of plates 24,28 are clamped together on the arms 22. An elastic band 30 engages around the arms 22 and over the stack of trays to engage around a hooked formation 31 on the top plate 28, thus keeping the stack of trays firmly together. However, the elastic bands 30 can be removed and the plates and trays pivoted apart to enable any desired tray to be removed from its plate for addition or removal or replacement of any of its splices.

The trays 20 are each generally circular with a flat base and a peripheral wall 21 on the base. The base is formed with two series of parallel ridges, one series either side of the centre of the base. Each series comprises alternate ridges e.g. 33 which are of lesser height than the intervening ridges e.g. 34. Further the space or slot between each adjacent pair of ridges is narrow at the roots of the ridges and wider adjacent the tops of the lesser-height ridges 33. Thus as shown, splices 35 of very small cross-section can be inserted between adjacent ridges at their roots, small or medium cross-section splices 36 can be inserted between adjacent ridges at a higher level, and larger cross-section splices 37 can be inserted between adjacent ones of the higher ridges, over the tops of the lower ridges.

At the outer ends of the two series of ridges, arcuate walls 38 are disposed at a small opening from the outer peripheral wall 21. Further, each tray is formed with four tangential extensions 40, two to each side of the diameter on which the series of ridges lie, these two converging in a direction away from but parallel to those ridges. Each tangential extension 40 is formed with two apertures 42 in its floor. From the top edge of the peripheral wall 21 of the base, two elongate projections 44 extend parallel to the base towards its centre, generally parallel to the ridges: also there are four small e.g. semi-circular radially-inward projections 46 between the ends of the arcuate walls 38 and the extensions 40. Finally, there are two radially-outwardly directed projections 48 from the top of the wall 21, on the same diameter as the ridges. There are recesses 50 in the peripheral wall 21 either side of these projections 48 and there are corresponding recesses 52 in the arcuate walls 38.

It will be seen that the splices are inserted between the ridges and the fibres are laid on arcuate paths to extend through the extensions 40 via the slots between the arcuate walls 38 and wall 21. The fibres are laid below the projections 44 and 46, which help to keep the fibres in place. Cable ties e.g. 54 are passed through the apertures 42 and tied around the fibres and side walls of the extensions to fix the fibres. Finally, a rubber band 56 is engaged around the projections 48 and extend across the fibre splices to hold these in place: the rubber band locates in the recesses 50,52 and so does not project above the top of the peripheral wall of the tray.

I claim:

1. An optical fibre splice storage tray, which is provided with a series of ridges, of which alternate ridges are of lesser height than the intervening ridges so that smaller cross-section splices can be disposed as an interference fit between any adjacent pair of the ridges and larger cross-section splices can be disposed as an interference fit between any adjacent pair of the higher ridges.

2. An optical fibre splice storage tray as claimed in claim 1 having a narrow space or slot between each adjacent pair of ridges at their roots.

3. An optical fibre splice storage tray as claimed in claim 2 having a wider space or slot between each adjacent pair of ridges at a higher level than said narrow slots.

4. An optical fibre splice storage tray as claimed in claim 3 in which an elastic strap is tensioned over the top of the tray and across the splices.

5. An optical fibre splice storage tray as claimed in claim 3 in which a mastic on non-stick malleable substance is used to bed the splices firmly into the slots.

6. An optical fibre splice storage tray as claimed in claim 5 in which a mastic or non-stick malleable substance is used to be the splices firmly into the slots, and in which said tray is circular.

7. An optical fibre splice storage tray as claimed in claim 3 in which means are provided for enabling the use of cable ties for securing fibre carrying tubes to the tray.

8. An optical fibre splice storage tray as claimed in claim 7 in which at least two projections from the top of the tray are provided to ensure that the fibres do not fall out during serve, and in which said at least two projections comprise two central projections positioned to ensure maximum fibre support.

9. An optical fibre splice storage tray as claimed in claim 8 having two series of slots, allowing splices to be put either side of the tray centre.

10. An optical fibre splice storage tray as claimed in claim 3 having two series of slots, allowing splices to be put either side of the tray centre.

11. An optical fibre splice storage tray as claimed in claim 1 in which means are provided for enabling the use of cable ties for securing fibre carrying tubes to the tray, and in which one or more projections from the top of the tray are provided to ensure that the fibres do not fall out during service, and in which two central projections are positioned to ensure maximum fibre support, and in which said optical fibre splice storage tray has two series of slots, allowing splices to be put either side of the tray centre, and in which the elastic strap is set in half-way down the tray to ensure both fibre and splice protector support, and in which the tray has four tubes carrying anchor points.

12. An optical fibre splice storage tray as claimed claim 1 in which an elastic strap is tensioned over the top of the tray and across the splices.

13. An optical fibre splice storage tray as claimed in claim 12 in which the elastic strap is set in half-way down the tray to ensure both fibre and splice protector support.

14. An optical fibre splice storage tray as claimed claim 1 in which a mastic or non-stick malleable substance is used to bed the splices firmly into the slots.

15. An optical fibre splice storage tray as claimed claim 1 in which the tray is circular.

16. An optical fibre splice storage tray as claimed claim 1 in which means are provided for enabling the use of cable ties for securing fibre carrying tubes to the tray.

17. An optical fibre splice storage tray as claimed claim 16 in which the tray has four tubes carrying anchor points.

18. An optical fibre splice storage tray as claimed claim 1 in which one or more projections from the top of the tray are provided to ensure that the fibres do not fall out during service.

19. An optical fibre splice storage tray as claimed claim 1 in which two central projections are positioned to ensure maximum fibre support.

20. An optical fibre splice storage tray as claimed claim 1 having two series of slots, allowing splices to be put either side of the tray centre.

* * * * *